(12) United States Patent
Sekhar et al.

(10) Patent No.: US 6,180,182 B1
(45) Date of Patent: Jan. 30, 2001

(54) HARD AND ABRASION RESISTANT SURFACES PROTECTING CATHODE BLOCKS OF ALUMINIUM ELECTROWINNING

(75) Inventors: Jainagesh A. Sekhar, Cincinnati, OH (US); Vittorio de Nora, Nassau (BS)

(73) Assignee: Moltech Invent S.A. (LU)

( * ) Notice: Under 35 U.S.C. 154(b), the term of this patent shall be extended for 0 days.

(21) Appl. No.: 09/117,063

(22) PCT Filed: Aug. 6, 1996

(86) PCT No.: PCT/IB96/00779

§ 371 Date: Mar. 29, 1999

§ 102(e) Date: Mar. 29, 1999

(87) PCT Pub. No.: WO97/06290

PCT Pub. Date: Feb. 20, 1997

Related U.S. Application Data

(63) Continuation-in-part of application No. 08/511,907, filed on Aug. 7, 1995, now Pat. No. 5,728,466.

(51) Int. Cl.⁷ ........................................................ B05D 1/08
(52) U.S. Cl. .................... 427/419.1; 427/419.2; 427/419.7; 427/431; 427/190; 427/126.1
(58) Field of Search .................. 427/126.1, 190, 427/419.1, 419.2, 419.7, 431; 204/290 R, 291, 294, 130, 243 R

(56) References Cited

U.S. PATENT DOCUMENTS

| | | | |
|---|---|---|---|
| 4,308,115 | * 12/1981 | Foster, Jr. et al. | 204/67 |
| 4,650,552 | * 3/1987 | De Nora et al. | 427/431 |
| 4,678,760 | * 7/1987 | Ray | 204/291 |
| 5,217,583 | * 6/1993 | Sekhar et al. | 204/67 |
| 5,378,327 | * 1/1995 | Sekhar et al. | 427/190 |
| 5,397,450 | * 3/1995 | Sekhar et al. | 264/105 |

* cited by examiner

*Primary Examiner*—Archene Turner
(74) *Attorney, Agent, or Firm*—Jayadeep R. Deshmukh

(57) ABSTRACT

A component of an aluminium production cell, in particular a cathode or a cell lining of an electrolytic cell for the production of aluminium by the electrolysis of alumina in cryolite, having an aluminium-wettable refractory coating on a heat-stable baked carbon-containing body, is produced from a part-manufactured cell component which is a layered composite of two precursors. A precursor layer of the aluminium-wettable refractory coating contains at least one aluminium-wettable refractory material in particulate form, or a particulate micropyretic reaction mixture which when ignited reacts to form at least one aluminium-wettable refractory material, or a mixture thereof, and non-carbon fillers and binders. A non-baked or part-baked precursor of the heat-stable carbon-containing body comprises particulate carbon compacted with a heat-convertible binder which when subjected to heat treatment binds the particulate carbon into the heat-stable carbon-containing body of the fully-manufactured cell component. This layered composite is convertible to the fully-manufactured cell component by heat treatment to form the aluminium-wettable refractory coating and simultaneously bind and heat-stabilize the carbon-containing body.

25 Claims, No Drawings

HARD AND ABRASION RESISTANT SURFACES PROTECTING CATHODE BLOCKS OF ALUMINIUM ELECTROWINNING

This application is a 371 of PCT/IB96/00779, filed Aug. 6, 1996 and a continuation in part of Ser. No. 08/511,907, filed Aug. 7, 1995, now U.S. Pat. No. 5,728,466.

FIELD OF THE INVENTION

The invention relates to the application of refractory materials to carbon cathode blocks of cells for the electrowinning of aluminium by electrolysis of alumina dissolved in a cryolite-based molten electrolyte. The invention also relates to the cathode blocks and to such cells incorporating them.

BACKGROUND OF THE INVENTION

Aluminium is produced conventionally by the Hall-Héroult process, by the electrolysis of alumina dissolved in cryolite-based molten electrolytes at temperatures up to around 950° C. A Hall-Héroult reduction cell typically has a steel shell provided with an insulating lining of refractory material, which in turn has a lining of carbon which contacts the molten constituents. Conductor bars connected to the negative pole of a direct current source are embedded in the carbon cathode substrate forming the cell bottom floor. The cathode substrate is usually a carbon lining made of prebaked anthracite-graphite or all graphite carbon blocks, joined with a ramming mixture of anthracite, coke, and coal tar.

In Hall-Héroult cells, a molten aluminium pool acts as the cathode. The carbon lining or cathode material has a useful life of three to eight years, or even less under adverse conditions. The deterioration of the cathode bottom is due to erosion and penetration of electrolyte and liquid aluminium as well as intercalation of sodium, which causes swelling and deformation of the cathode carbon blocks and ramming mix. In addition, the penetration of sodium species and other ingredients of cryolite or air leads to the formation of toxic compounds including cyanides.

Difficulties in operation also arise from the accumulation of undissolved alumina sludge on the surface of the carbon cathode beneath the aluminium pool which forms insulating regions on the cell bottom. Penetration of cryolite and aluminium through the carbon body and the deformation of the cathode carbon blocks also cause displacement of such cathode blocks. Due to cracks in the cathode blocks, aluminium reaches the steel cathode conductor bars causing corrosion thereof leading to deterioration of the electrical contact, non uniformity in current distribution and an excessive iron content in the aluminium metal produced.

A major drawback of carbon as cathode material is that it is not wetted by aluminium. This necessitates maintaining a deep pool of aluminium (100–250 mm thick) in order to ensure a certain protection of the carbon blocks and an effective contact over the cathode surface. But electromagnetic forces create waves in the molten aluminium and, to avoid short-circuiting with the anode, the anode-to-cathode distance (ACD) must be kept at a safe minimum value, usually 40 to 60 mm. For conventional cells, there is a minimum ACD below which the current efficiency drops drastically, due to short-circuiting between the aluminium pool and the anode or to oxidation of the aluminium produced. The electrical resistance of the electrolyte in the inter-electrode gap causes a voltage drop from 1.8 to 2.7 volts, which represents from 40 to 60 percent of the total voltage drop, and is the largest single component of the voltage drop in a given cell.

To reduce the ACD and associated voltage drop, extensive research has been carried out with Refractory Hard Metals or Refractory Hard Materials (RHM) such as $TiB_2$ as cathode materials. $TiB_2$ and other RHM's are practically insoluble in aluminium, have a low electrical resistance, and are wetted by aluminium. This should allow aluminium to be electrolytically deposited directly on an RHM cathode surface, and should avoid the necessity for a deep aluminium pool. Because titanium diboride and similar Refractory Hard Metals are wettable by aluminium, resistant to the corrosive environment of an aluminium production cell, and are good electrical conductors, numerous cell designs utilizing Refractory Hard Metal have been proposed, which would present many advantages, notably including the saving of energy by reducing the ACD.

The use of titanium diboride and other RHM current-conducting elements in electrolytic aluminium production cells is described in U.S. Pat. Nos. 2,915,442, 3,028,324, 3,215,615, 3,314,876, 3,330,756, 3,156,639, 3,274,093 and 3,400,061. Despite extensive efforts and the potential advantages of having surfaces of titanium diboride at the cell cathode bottom, such propositions have not been commercially adopted by the aluminium industry.

The non-acceptance of tiles and other methods of applying layers of $TiB_2$ and other RHM materials on the surface of aluminium production cells is due to their lack of stability in the operating conditions, in addition to their cost. The failure of these materials is associated with penetration of the electrolyte when not perfectly wetted by aluminium, and attack by aluminium because of impurities in the RHM structure. In RHM pieces such as tiles, oxygen impurities tend to segregate along grain boundaries leading to rapid attack by aluminium metal and/or by cryolite. To combat disintegration, it has been proposed to use highly pure $TiB_2$ powder to make materials containing less than 50 ppm oxygen. Such fabrication further increases the cost of the already-expensive materials. No cell utilizing $TiB_2$ tiles as cathode is known to have operated for long periods without loss of adhesion of the tiles, or their disintegration. Other reasons for failure of RHM tiles have been the lack of mechanical strength and resistance to thermal shock.

Various types of $TiB_2$ or RHM layers applied to carbon substrates have failed due to poor adherence and to differences in thermal expansion coefficients between the titanium diboride material and the carbon cathode block.

PCT patent application WO93/25731 describes a carbon-containing component of a cell for the production of aluminium by the electrolysis of alumina dissolved in a cryolite-based molten electrolyte, which cell component is protected from attack by liquid and/or gaseous components of the electrolyte or products produced during cell operation by a coating of particulate refractory hard metal boride and a colloid bonding applied from a slurry of the boride in a colloidal carrier which comprises at least one of colloidal alumina, silica, yttria, ceria, thoria, zirconia, magnesia, lithia, monoaluminium phosphate or cerium acetate.

The method of applying the refractory coating of WO93/25731 involved applying to the surface of the component a slurry of particulate refractory boride in the colloidal carrier, followed by drying and a heat treatment to consolidate the boride coating without any reaction taking place, this heat treatment preferably being in air or other oxidising atmospheres or alternatively in inert or reducing atmospheres. A heat treatment in air at about 80–200° C., for half an hour to several hours was found to be sufficient.

WO 95/13407 discloses manufacturing an aluminium electrowinning cell component having a refractory coating on a carbon body starting from a refractory coating precursor and a green carbon body that are baked together, to simultaneously produce the coating and bake the carbon body.

SUMMARY OF THE INVENTION

The invention aims to further improve the refractory coatings described in WO93/25731 as surface coatings on carbonaceous substrates, for protecting the substrates from the corrosive attacks of liquids and gases when used as cell components for aluminium production cells, especially for use as cathodes.

An object of the invention is to provide improved hard coatings containing borides that have exceptional adherence to the carbon-containing substrates, provide the required protection to the cell components and have improved mechanical, physical, chemical, and electrochemical characteristics.

Another object of the invention is to provide an improved method of applying refractory borides to carbon-containing cell components to form a hard coating wherein a part of the boride is reacted by heat treatment before use of the cell component to improve its protection.

According to the invention, an improved hard surface is provided on a carbon body to be used as cathode block in cells for the electrowinning of aluminium by adding to the surface of the block one or more layers containing particulate refractory hard metal boride and bonding material which when heated reacts with the refractory hard metal boride and carbon from the carbon body or from a carbon-containing atmosphere, to form the hard surface.

Such improved surfaces are very hard; resistant to sodium penetration whereby sodium penetration is controlled; abrasion resistant hence resistant to erosion, corrosion resistant; preferably wettable by molten aluminium; and resistant to attack by molten aluminium.

The surface layer usually contains 30–97 wt % of refractory hard metal boride, 3–50 wt % bonding material and 0–50 wt % of non-reactive fillers.

The carbon body to be used as cathode block may initially be a green (i.e. non-baked or part-baked) body comprising particulate carbon compacted with a heat-convertible binder which, when subjected to the heat treatment under the non-oxidising atmosphere, binds the carbon into a final heat stable carbon body during the reaction forming the hard surface. This heat-convertible binder can be a carbon-based material such as pitch, or may be non-carbonaceous. During the heat treatment, carbon from the green carbon body or from a carbon-containing atmosphere, reacts with the refractory hard metal and/or the bonding material.

The coating's bonding material and filler, if present, are generally carbon-free, which avoids the known problems of refractory boride embedded in carbon binders which are unstable in contact with molten aluminium.

The preferred non-carbon bonding materials are colloids selected from colloidal alumina, silica, yttria, ceria, thoria, zirconia, magnesia, lithia, monoaluminium phosphate or cerium acetate.

In the reaction which takes place under the non-oxidising atmosphere, the colloid and particulate refractory boride react to form at least one stable compound between at least two elements selected from: at least one element derived from the colloid; boron derived from the refractory metal boride; refractory metal derived from the refractory metal boride; carbon and oxygen.

Preferably, the colloid is colloidal alumina and the hard surface comprises at least one compound formed between aluminium derived from the colloid and at least one of: the refractory hard metal; boron; and carbon. Such compounds; include $Ti_3AlC$, $AlB_{10}$, $Al_4B_2O_9$, $Al_{18}B_4O_{33}$ and $Al(BO_3)O_6$. Other possible compounds include $Al_3Ti$ and $AlB_2$.

As known from WO 93/25731, the colloid may be derived from colloid precursors and reagents which are solutions of at least one salt such as chlorides, sulfates, nitrates, chlorates, perchlorates or metal organic compounds such as alkoxides, formates, acetates of aluminium, silicon, yttrium, cerium, thorium zirconium, magnesium and lithium. These colloid precursors or colloid reagents can contain a chelating agent such as acetyl acetone or ethylacetoacetate. The aforesaid solutions of metal organic compounds, principally metal alkoxides, can be of the general formula $M(OR)_z$ where M is a metal or complex cation, R is an alkyl chain and z is a number, preferably from 1 to 12.

In particular, an aluminium-wettable, refractory, electrically conductive, adherent boride coating has been developed containing compounds such as $Ti_3AlC$ and $AlB_{10}$, which coatings are applied to the surface of the cathode block made of carbonaceous material before use in an aluminium electrowinning cell, to enhance protection of the carbonaceous material from the attack of sodium and air which produces deformation of the cathode blocks and formation of dangerous nitrogen compounds such as cyanides, and attack by molten aluminium.

By improving protection of the carbonaceous cell components from attack by NaF or other aggressive ingredients of the electrolyte and molten aluminium, the cell efficiency is further improved. Because NaF in the electrolyte no longer reacts with the carbon cell bottom, the cell functions with a defined bath ratio without a need to replenish the electrolyte with NaF.

The aluminum-wettable refractory boride coating containing compounds such as $Ti_3AlC$ or $AlB_{10}$, will also permit the elimination of the thick aluminium pool required to partially protect the carbon cathode, enabling the cell to operate with a drained cathode.

The protective effect of the coatings according to the invention is such as to enable the use of relatively inexpensive carbon-containing materials for the cathode blocks. For instance, cheaper grades of graphite can be used instead of the more expensive anthracite forms of carbon, while providing improved resistance against the corrosive conditions in the cell environment.

The hard and abrasion-resistant coatings containing said further compounds have the following attributes: excellent wettability by molten aluminium, excellent adherence to the carbon-containing substrates, inertness to attack by molten aluminium and cryolite, particularly with low levels of titanium and boron in the molten aluminium, sufficient to inhibit dissolution of the coating, low cost, environmentally safe, ability to absorb thermal and mechanical shocks without delamination from the anthracite-based carbon or other carbonaceous substrates, durability in the environment of an aluminium production cell, and ease of application and processing. The preferred coatings furthermore have a controlled microporosity and degree of penetration in the porous carbonaceous substrate, by having an adequate distribution of the particle sizes of the preformed refractory boride.

Compared to the corresponding boride coatings of WO/93/25731 without said further compounds, the coatings of this invention with further compounds such as $Ti_3AlC$ and $AlB_{10}$, have the following advantages: greater hardness and resistance to mechanical wear, for example due to movements in the aluminium pool; better adhesion to the carbon substrate; and essentially complete inertness to reaction with molten aluminium or other molten cell components.

When these refractory boride coatings containing said further compounds are applied for instance to graphite or anthracite-based carbon used as cathode blocks, the hard surface protect the substrate against the ingress of cryolite and sodium and is in turn protected by the protective film of aluminium on the coating itself.

The hard surfaces are also useful in cells where the temperature of operation is low as in the Low Temperature electrolysis process for the production of aluminium (see for example U.S. Pat. No. 4,681,671 and PCT application PCT/EP92/02666).

The particulate refractory boride is selected from borides of titanium, chromium, vanadium, zirconium, hafnium, niobium, tantalum, molybdenum and cerium. The preferred particulate refractory boride is titanium diboride. These borides may be used alone or in combination with refractory hard metal carbides.

As known from WO 93/25731, when choosing powder additives the particle size selection is of importance. It is preferable to choose particle size below 100 micrometers and to choose particle sizes which are varied such that the packing of particles is optimized. For example it is preferable to choose particle sizes extending over a range where the smallest particles are at least two times and preferably at least three times smaller than the large ones. Generally, the ratio of the particle sizes will be in the range from 2:1 to 15:1, usually from about 3:1 to 10:1, for instance a ratio of about 3:1 with large particles in the range 15 to 30 micrometers and small particles in the range 5 to 10 micrometers, or a ratio of about 10:1 with large particles in the range from 30 to 50 micrometers and small particles in the range from 3 to 5 micrometers. Usually, the particulate metal boride has particles with sizes in the range from about 3 micrometers to about 50 micrometers.

To apply the particulate refractory boride, a slurry is formed with at least one of these colloids in a liquid carrier. The slurry usually contains 5–100 g of the particulate refractory boride per 10 ml of colloid and the colloid has a dry colloid content corresponding to up to 50 weight % of the colloid plus liquid carrier, preferably from 10 to 20 weight %.

The colloid is contained in a liquid such as water which may further contain at least one compound selected from compounds of lithium, aluminium, cerium, sodium and potassium, for instance at least one compound of lithium and at least one compound of aluminium, see PCT patent application WO 94/21573, the contents whereof are incorporated herein by way of reference.

Method of Production

Another aspect of the invention is a method of protecting carbon-containing cathodes from the attack of cryolite, molten aluminium and sodium, and improving their hardness and erosion resistance, comprising applying to the carbon body for forming the cathode block a layer of particulate refractory hard metal boride with the aforementioned bonding materials, and heating the body under a non-oxidising atmosphere to cause the bonding material to react with the refractory hard metal boride and carbon from the carbon-containing body or from a carbon-containing atmosphere, to form the surface layer of improved hardness and abrasion resistance.

The method preferably involves applying to the surface of the body a slurry of particulate refractory boride in a liquid carrier including the bonding material, followed by drying, and by the reactive heat treatment under a non-oxidising atmosphere before or after the body is installed as cathode in an aluminium production cell, but before use of the cell.

The method of application of the slurry involves painting (by brush or roller), dipping, spraying, or pouring the slurry onto the substrate and allowing for drying before another layer is added. The coating need not entirely dry before the application of the next layer, but it is preferred to heat the coating with a suitable heat source so as to completely dry it and improve densification of the coating. Heating then takes place in an inert or a reducing atmosphere, preferably with the colloid-applied coating under a bed of carbon or under a carbon-containing atmosphere such as $CO/CO_2$ possibly mixed with nitrogen.

Heating under an inert or a reducing atmosphere, in particular a carbon-containing inert atmosphere, may take place at about 850° C.–1300° C., usually 900° C.–1200° C., for at least 10 hours.

Excellent results are obtained at about 950° C. for about 24 hours.

In view of the great stability of refractory borides such as $TiB_2$, it is extremely surprising to find that by sustained heating under an inert or a reducing atmosphere—particularly a carbon-based reducing atmosphere—these borides in the presence of the colloid react to form stable compounds with elements derived from the colloid and with carbon.

As these reactions are carried out before the boride-based coating is exposed to molten aluminium and other molten components of the cell environment, the resistance of the coating to the molten cell components during use of the cell is enhanced.

The bonding material preferably comprises at least one colloid selected from colloidal alumina, silica, yttria, ceria, thoria, zirconia, magnesia, lithia, monoaluminium phosphate or cerium acetate.

The colloid and particulate refractory boride react to form at least one stable compound between at least one element derived from the colloid and at least one of: boron derived from the refractory metal boride; refractory metal derived from the refractory metal boride; and carbon and oxygen. In particular, the colloid is colloidal alumina which reacts to form at least one compound between aluminium derived from the colloid and at least one of: the refractory hard metal; boron; and carbon.

The slurry is usually applied in several layers, each layer being allowed to dry at least partially in the ambient air or assisted by heating before applying the next layer, followed by a final heat treatment to dry the slurry after application of the last layer.

The slurry usually comprises 5–100 g of the particulate refractory boride per 10 ml of colloid, and the colloid has a dry colloid content corresponding to up to 50 weight % of the colloid plus liquid carrier, preferably from 10 to 20 weight %. The colloid may be contained in a liquid carrier which further contains at least one compound selected from compounds of lithium, aluminium, cerium, sodium and potassium.

The substrate may be treated by sand blasting or pickled with acids or fluxes such as cryolite or other combinations of fluorides and chlorides prior to the application of the coating. Similarly the substrate may be cleaned with an organic solvent such as acetone to remove oily products and other debris prior to the application of the coating. These treatments will enhance the bonding of the coatings to the carbon-containing substrate.

Generally, before or after application of the hard surface and before use, the body can be painted, sprayed, dipped or infiltrated with reagents and precursors, gels and/or colloids. For instance, before applying the slurry of particulate refractory boride in the colloidal carrier the carbonaceous component can be impregnated with e.g. a compound of lithium to improve the resistance to penetration by sodium, as described in PCT patent application WO 94/20650 the contents whereof are incorporated herein by way of reference.

To assist rapid wetting of the cathode blocks by molten aluminium, the aluminium wettable surface layer may be exposed to molten aluminium, for example in the presence of a flux assisting penetration of aluminium into the refractory material, the flux for example comprising a fluoride, a chloride or a borate of lithium or sodium, or mixtures thereof. Such treatment favors aluminization of the refractory coating by the penetration therein of aluminium.

The cathode block may be coated outside the aluminium production cell and the coated block then inserted into the cell. Alternatively, the cathode block is already assembled in a cell bottom and coating takes place in the cell prior to operation. Thus, the block is part of a cell bottom forming by an exposed area of carbonaceous material. In this case, the slurry is preferably applied to the cell bottom in several layers with drying of each successive layer, drying by means of a mobile heat source and heat treatment under an inert or a reducing atmosphere to produce the desired reactions.

As mentioned the carbon body may be a green body i.e. is a non-baked or part-baked body comprising particulate carbon compacted with a heat-convertible binder which when subjected to the heat treatment binds the carbon into a final heat stable carbon body and reacts with the coating components to form the aluminium-resistant coating.

Cell Components

The invention concerns principally carbon cathode blocks and also concerns other cell components of aluminium production cells, in particular components which in use are exposed to corrosive or oxidising gas released in operation of the cell or present in the cell operating conditions, which components are protected from corrosion or oxidation by the aluminium resistant surface layer as set out above.

According to the invention, there is provided a component of a cell for the electrowinning of aluminium, comprising a carbon body having a hard and preferably aluminium wettable surface layer obtained by heating an applied layer of particulate refractory hard metal boride with at least one bonding material which when heated reacts with the refractory hard metal boride and carbon from the carbon-containing body or from a carbon-containing atmosphere.

This cell component can incorporate all of the features of the above-described carbon cathode block with its hard surface layer, in particular it is protected from attack by liquid and/or gaseous components of the electrolyte in the form of elements, ions or compound, by a coating of pre-formed particulate refractory hard metal boride and other compounds formed by reaction with the bonding material.

The component may be a current-carrying component for example a cathode, a cathode current feeder, or a bipolar electrode coated on its cathode face.

The component may also be a non current-carrying component for example a cell sidewall.

The slurry-applied refractory boride coatings containing said other reaction-formed compounds may have a thickness from about 150 micrometers to about 1500 micrometers, usually from about 200 to about 500 micrometers, depending on the number of applied layers, the particle size of the preformed boride, and the porosity of the carbon. Advantageously, by using graded boride particles including fine particles, the smaller boride particles penetrate into the pores of the carbon component and firmly anchor the coating. Typically, the boride may impregnate the carbon to a depth of about 50–200 micrometers, and the aforesaid compounds may also be formed in this zone. The colloid impregnates the carbon component so the dried colloid is dispersed through the carbon component.

The invention concerns in general the protection of components of electrochemical cells for the electrowinning of aluminium by the electrolysis of alumina dissolved in a cryolite-based molten electrolyte, which components in use are exposed to a corrosive atmosphere, or to a molten cryolite, and/or to a product of electrolysis in the cell, in particular to molten aluminium. Such components are coated with a hard protective surface coating which improves the resistance of the components to oxidation or corrosion and which may also enhance the electrical conductivity and/or electrochemical activity. The protective coating is preferably applied from a colloidal slurry containing particulate preformed refractory boride and dried. When the component is heated to a sufficient elevated temperature under an inert or a reducing atmosphere, prior to or upon insertion in the cell but before use of the cell, a protective coating is formed with reaction between compounds of the colloid, boron from the boride, the refractory metal from the boride and with carbon.

The invention also concerns a component of an aluminium production cell which in use is subjected to exposure to molten cryolite and/or to molten aluminium or corrosive fumes or gases, the component comprising a substrate of a carbonaceous material, coated with a refractory boride, of at least one of titanium, chromium, vanadium, zirconium, hafnium, niobium, tantalum, molybdenum and cerium or mixtures thereof, finely mixed with a refractory compound of at least one alumina, silica, yttria, ceria, thoria, zirconia, magnesia and lithia from a dried colloid and at least one stable compound formed between at least one element derived from the colloid (in particular aluminium from colloidal alumina); boron derived from the refractory metal boride; refractory metal derived from the refractory metal boride; carbon; and oxygen.

The component is usually made of carbonaceous material selected from petroleum coke, metallurgical coke, anthracite, graphite, amorphous carbon, fullerene, low density carbon or mixtures thereof. Composite materials based on one or more of these forms of carbon with other materials may also be employed.

It is possible for the component to have a substrate of low-density carbon protected by the refractory boride, for example if the component is exposed to oxidising gas released in operation of the cell, or also when the substrate is part of a cell bottom. Low density carbon embraces various types of relatively inexpensive forms of carbon which are relatively porous and very conductive, but hitherto could not be used successfully in the environment of aluminium production cells on account of the fact that they were subject to excessive corrosion or oxidation. Now it is possible by coating these low density carbons according to the invention, to make use of them in these cells instead of the more expensive high density anthracite and graphite, taking advantage of their excellent conductivity and low cost.

The substrate usually consists of carbonaceous blocks that can be fitted together to form a cell bottom of an aluminium production cell, or may be packed carbonaceous particulate material forming a cell bottom, which acts to carry current to the cathodic pool if there is one, or to a thin layer of aluminium through the refractory boride coating in drained cells.

The component advantageously forms part of a cathode through which the electrolysis current flows, the hard coating containing said further compounds forming a cathodic surface in contact with the cathodically-produced aluminium. For example, it is part of a drained cathode, the refractory boride coating forming the cathodic surface on which the aluminium is deposited cathodically, and the component being arranged usually upright or at a slope for the aluminium to drain from the cathodic surface.

Electrolytic Cells and Operation

The invention also relates to an aluminium production cell comprising a coated component as discussed above as well as a method of producing aluminium using such cells and methods of assembling and/or operating the cells.

Such cells may comprise a component which in operation of the cell is exposed to molten cryolite or aluminium, said component comprising a substrate of carbonaceous material and a coating of refractory boride, applied from a colloidal slurry and reacted as discussed above, wherein the product aluminium is in contact with the hard surface on the component, which may be a cathode or forms part of a cathodic cell bottom.

It should be noted that aluminium-containing compounds such as $Ti_3AlC$, or $AlB_{10}$ in the coating are produced by reaction with aluminium from the colloid such as colloidal alumina. This reaction takes place during the heat treatment under an inert or reducing atmosphere, prior to use of the cell. The reaction does not take place in contact with the product aluminium. These pre-formed compounds make the coating essentially inert to the product aluminium.

The invention also concerns an aluminium production cell having a component which in operation of the cell is exposed to corrosive or oxidising gas released in operation of the cell or present in the cell operating conditions, or exposed to molten cryolite, said component comprising a substrate of carbonaceous material, and a coating of refractory boride deposited in particular from a colloidal slurry and reacted, as discussed above.

A method of operating the cells comprises:
producing a cell component which comprises a substrate of carbonaceous material and a hard surface of refractory boride by applying to the carbon substrate a layer of particulate refractory hard metal boride with bonding material as discussed above, and heating the body under a non-oxidising atmosphere to cause the refractory hard metal boride to react to form an aluminium resistant surface layer, in particular by the methods as described above;
placing the coated component in the cell so the hard surface will be contacted by the cathodically produced aluminium, and/or the molten electrolyte, and/or the anodically-released gases; and
operating the cell with the hard surface protecting the substrate from attack by the cathodically-produced aluminium and by the molten electrolyte (and possibly by the anodically-released gases with which it is in contact).

Operation of the cell may be under standard conditions encountered in Hall-Héroult cells, or in a low temperature process, with the molten halide electrolyte containing dissolved alumina at a temperature below 900° C., usually at a temperature from 680° C. to 880° C. The low temperature electrolyte may be a fluoride melt or a mixed fluoride-chloride melt.

This low temperature process is operated at low current densities on account of the low alumina solubility. This necessitates the use of large anodes and corresponding large cathodes, exposing large areas of these materials to the corrosive conditions in the cell, such large exposed areas being well protected by the refractory coatings according to the invention which are just as advantageous at these lower temperatures.

Generally, the improved coatings of this invention can be applied in a similar manner to those described and illustrated in WO 93/25731 but with the heat treatment under an inert or a reducing atmosphere to react the coatings as described above, and as further illustrated in the following Examples.

EXAMPLE I

A slurry was prepared from a dispersion of 25 g $TiB_2$, 99.5% pure, −325 mesh (<42 micrometer), in 10 ml of colloidal alumina containing about 20 weight % of solid alumina. Coatings with a thickness of 150±50 to 500±50 micrometer were applied to the faces of carbon blocks. Each layer of slurry was allowed to dry for about one hour (generally from several minutes up to a few hours) before applying the next, followed by a drying by baking in an oven at 100–150° C. for 30 minutes to 1 hour.

The above procedure was repeated varying the amount of $TiB_2$ in the slurry from 5 to 15 g and varying the amount of colloidal alumina from 10 ml to 40 ml. Coatings were applied as before. Drying in air took 10 to 60 minutes depending on the dilution of the slurry and the thickness of the coatings. In all cases, an adherent layer of $TiB_2$ was obtained.

The coated carbon blocks were then placed under a layer of powdered carbon and heated at 900° C.–1000° C. for 18–36 hours, typically at 950° C. for 24 hours. This heating takes place in a furnace under air, but the presence of the carbon powder on the coating ensures that the coating is effectively exposed to a reducing atmosphere of $CO/CO_2$ containing nitrogen.

After cooling, analysis of the coating revealed the presence of a $TiB_2$ layer adhering firmly to the carbon substrate, containing substantial amounts of $Ti_3AlC$ and $AlB_{10}$ and traces of $Al_4B_2O_9$, $Al_{18}B_4O_{33}$ and $Al(BO_3)O_6$ showing that the titanium and the boron from the $TiB_2$ had reacted with aluminium from the colloidal alumina, with carbon from the reducing $CO/CO_2$ atmosphere, the covering layer and/or from the substrate, and with oxygen from the reducing $CO/CO_2$ atmosphere.

When tested as cathode in a laboratory aluminium production cell, the sample showed good wettability with molten aluminium and no sign of deterioration. The aluminium was found to penetrate the coating and remain there.

EXAMPLE II

An anthracite-based cathode sample was coated with an adherent layer containing $TiB_2$ as follows.

A layer of particulate $TiB_2$, 99.5% pure, was applied to an anthracite cathode sample in three coats using a solution of 25 g $TiB_2$ −325 mesh (<42 micrometer) in 10 ml of colloidal alumina containing about 20% of the colloid. Each coating had a thickness of 150±50 micrometer, and was dried for about an hour before applying the next coating. The sample was then finally dried in air at about 120° C. for about ½ hour to 1 hour.

The coated carbon blocks were then placed under a layer of powdered carbon and heated at 900° C.–1000° C. for 18–36 hours, typically at 950° C. for 24 hours. This heating takes place in a furnace under air, but the presence of the carbon powder on the coating ensures that the coating is effectively exposed to a reducing atmosphere of $CO/CO_2$ containing nitrogen. After cooling, analysis of the coating revealed the presence of a $TiB_2$ layer adhering firmly to the anthracite substrate, containing substantial amounts of $Ti_3AlC$ and $AlB_{10}$ and traces of $Al_4B_2O_9$, $Al_{18}B_4O_{33}$ and $Al(BO_3)O_6$, as in Example I.

EXAMPLE III

Specimens were machined from a commercial green carbon cathode block and were coated with a layer of $TiB_2$ approximately 1.5–2 mm thick following the procedure of Example I.

The coated green carbon blocks were then packed into a graphite crucible, covered with coke grains, placed in a furnace and baked at 1200° C. for 12 hours.

The coatings were found be exceptionally hard and abrasion resistant. The measured hardness was from 63–80° Sh (average 77° Sh), compared to 37–38° Sh for uncoated specimens.

The abrasion resistance, expressed as % weight loss measured by a grinding method, was 0.01–0.7% (average 0.04%) compared to 1.1–1.3% for uncoated samples.

EXAMPLE IV

Specimens were machined from a commercial pre-baked carbon cathode block and were coated with a layer of $TiB_2$ approximately 1,5–2 mm thick following the procedure of Example I.

The carbon blocks were then packed into a graphite crucible, covered with coke grains, placed in a furnace and re-baked at 950° C. or 1000° C. for 12 hours.

The measured hardness (average and extreme values) and abrasion resistance of the surfaces were as shown in Table I.

TABLE I

| Rebaking Temperature | Hardness °Sh | Abrasion resistance weight loss, % |
|---|---|---|
| 950° C. | 48 (44 ÷ 52) | 0.02 |
| 100° C. | 62 (57 ÷ 64) | 0.0 |

EXAMPLE V

Example III was repeated except that, after allowing each applied coated layer of $TiB_2$ to dry for about 1 hour before applying the next layer, the coated green carbon blocks, without prebaking, were furnace baked under coke at 1200° C. for 12 hours to simultaneously bake and react the coating, and bake the carbon blocks. As before, the finished surface had exceptional hardness and abrasion resistance.

What is claimed is:

1. A method for producing an improved carbon body to be used as cathode block in cells for the electrowinning of aluminum, to which a hard surface is provided by applying to the surface of the carbon body one or more layers containing particulate refractory hard metal boride and a carbon-free bonding material which when the carbon body is heated reacts with the refractory hard metal boride and carbon from the surface of the carbon body or from a carbon-containing atmosphere, comprising applying to the carbon body one or more layers of particulate refractory hard metal boride with the bonding material, and heating the body under a non-oxidizing atmosphere to cause the bonding material to react with the refractory hard metal boride and carbon from the carbon-containing body or from a carbon-containing atmosphere, to form the hard surface layer.

2. The method of claim 1, comprising applying to the surface of the carbon body a slurry of particulate refractory boride in a liquid carrier including the bonding material, followed by drying, and by reactive heat treatment under a non-oxidising atmosphere before or after the body is installed as cathode block in an aluminium production cell, but before use of the cell.

3. The method of claim 1, wherein the heat treatment is carried out under a bed of carbon powder to form a $CO/CO_2$ atmosphere.

4. The method of claim 1, wherein the heat treatment is carried out at 850° C.–1300° C. for at least 10 hours.

5. The method of claim 2, wherein the bonding material comprises at least one colloid selected from colloidal alumina, silica, yttria, ceria, thoria, zirconia, magnesia, lithia, monoaluminium phosphate or cerium acetate.

6. The method of claim 5, wherein the colloid and particulate refractory boride react to form at least one stable compound between at least one element derived from the colloid with at least one of: boron derived from the refractory metal boride; refractory metal derived from the refractory metal boride; carbon; and oxygen.

7. The method of claim 5, wherein the colloid is colloidal alumina and reacts to form at least one compound between aluminium derived from the colloid and at least one of: the refractory hard metal; boron; and carbon.

8. The method of claim 2, wherein the slurry is applied in several layers, each layer being allowed to dry at least partially in the ambient air or assisted by heating before applying the next layer, followed by a heat treatment to dry the slurry after application of the last layer, and by reactive heat treatment.

9. The method of claim 1, wherein the particulate refractory boride is selected from borides of titanium, chromium, vanadium, zirconium, hafnium, niobium, tantalum, molybdenum and cerium.

10. The method of claim 9, wherein the particulate refractory boride is titanium diboride.

11. The method of claim 9, wherein the particulate refractory boride has a particle size below 100 micrometers.

12. The method of claim 11, wherein the particulate refractory boride comprises particles of different sizes to optimize packing of the particles, with a particle size ratio of at least 2:1.

13. The method of claim 12, wherein the particle size ratio of the particulate refractory boride is in the range 3:1 to 10:1.

14. The method of claim 12, wherein the particulate refractory boride has particles with sizes in the range from about 3 micrometers to about 50 micrometers.

15. The method of claim 5, wherein the slurry comprises 5–100 g of the particulate refractory boride per 10 ml of colloid.

16. The method of claim 15, wherein the colloid has a dry colloid content corresponding to up to 50 weight % of the colloid plus liquid carrier.

17. The method of claim 15, wherein the colloid has a dry colloid content corresponding to from 10 to 20 weight % of the colloid plus liquid carrier.

18. The method of claim 5, wherein the colloid is contained in a liquid carrier which further contains at least one compound selected from compounds of lithium, aluminium, cerium, sodium and potassium.

19. The method of claim 5, wherein the liquid carrier contains at least one compound of lithium and at least one compound of aluminium.

20. The method of claim 1, wherein the applied layer(s) contain sufficient refractory hard metal boride to render the resulting hard surface wettable by molten aluminium.

21. The method of claim 20, wherein after drying and heat treatment the aluminium wettable hard surface layer is aluminized by contact with molten aluminium.

22. The method of claim 2, wherein the refractory boride is applied by dipping the body in the slurry, painting, spraying or combinations of such application techniques, in single or multi-layer coatings.

23. The method of claim 1, wherein the carbon body is painted, sprayed, dipped or infiltrated with reagents and precursors, gels and/or colloids before and/or after the reactive heat treatment to produce the hard surface layer.

24. The method of claim 1, wherein the carbon body is a green body comprising particulate carbon compacted with a heat-convertible binder which when subjected to the heat treatment binds the carbon into a final heat stable carbon body, and wherein carbon from the carbon body reacts with at least one of the bonding material and refractory hard metal boride.

25. A method of producing a hard, abrasion-resistant aluminium-wettable surface layer on a carbon body to be used as cathode block in cells for the electrowinning of aluminium, comprising applying a layer of particulate refractory metal boride with bonding material, to a green body comprising particulate carbon compacted with a heat-convertible binder which when subjected to the heat treatment binds the carbon into a final heat stable carbon body, and subjecting the body to reactive heat treatment in a non-oxidising atmosphere at 850° C.–1300° C. for at least 10 hours during which carbon from the carbon body or contained in the non-oxidising atmosphere reacts with the bonding material and the refractory hard metal boride.

* * * * *